181-233 SR

11/25/86 XR 4,624,415

United States Patent [19]

Hofstetter, Jr.

[11] Patent Number: 4,624,415

[45] Date of Patent: Nov. 25, 1986

[54] CONTROL ASSEMBLY

[75] Inventor: Edward G. Hofstetter, Jr., Fairhaven, N.J.

[73] Assignee: American Standard Inc., New York, N.Y.

[21] Appl. No.: 718,144

[22] Filed: Apr. 1, 1985

[51] Int. Cl.$^4$ .......... B05B 1/14; F01N 3/02; E03B 3/18; F16L 9/14

[52] U.S. Cl. .......... 239/590.3; 239/553; 181/230; 181/231; 181/233; 137/544; 137/801; 138/40

[58] Field of Search .......... 137/544, 546, 801; 138/40, 41; 181/223, 227, 230, 231, 233; 239/553, 553.3, 553.5, 590, 590.3, 590.5

[56] References Cited

U.S. PATENT DOCUMENTS

| | | | |
|---|---|---|---|
| 1,097,474 | 5/1914 | Schroder | 366/336 |
| 1,110,959 | 9/1914 | Niewiardowski | 285/8 |
| 1,498,788 | 6/1924 | Deming | 137/603 |
| 2,194,163 | 3/1940 | Dahl | 181/49 |
| 2,320,050 | 5/1943 | Peterson | 137/111 |
| 2,401,665 | 6/1946 | Schick | 138/40 |
| 2,634,842 | 4/1953 | Caylor | 406/192 X |
| 2,762,397 | 9/1956 | Miller | 138/43 |
| 2,988,288 | 6/1961 | Nielsen | 239/590.5 X |
| 3,630,455 | 5/1978 | Parkison | 239/535 |
| 3,697,002 | 10/1972 | Parkison | 239/535 |
| 4,200,119 | 4/1980 | Cunningham | 137/605 |
| 4,294,289 | 10/1981 | Fischer | 138/44 |
| 4,364,523 | 12/1982 | Parkison | 239/533 |

FOREIGN PATENT DOCUMENTS

| | | | |
|---|---|---|---|
| 5340 | of 1914 | United Kingdom | 138/40 |
| 464954 | 4/1937 | United Kingdom | 181/46 |
| 706197 | 3/1954 | United Kingdom | 138/40 |

*Primary Examiner*—Johnny D. Cherry
*Assistant Examiner*—Patrick N. Burkhart
*Attorney, Agent, or Firm*—James J. Salerno, Jr.; Robert G. Crooks; John P. Sinnott

[57] ABSTRACT

This invention is directed to a nozzle or spout for a sanitary fitting, which is arranged and constructed to reduce the noise of fluid, (water), as it flows through the nozzle or spout passageway and which also removes particles entrained in the fluid, (water), before flowing through the nozzle or spout passageways, to prevent clogging.

11 Claims, 5 Drawing Figures

FIG. 2
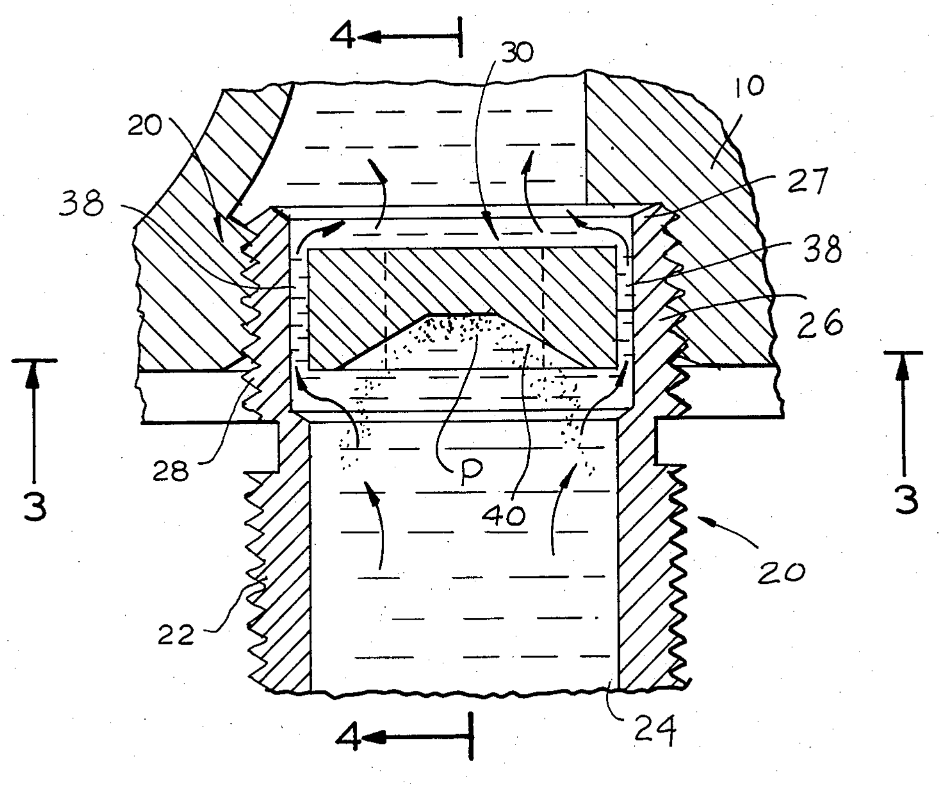
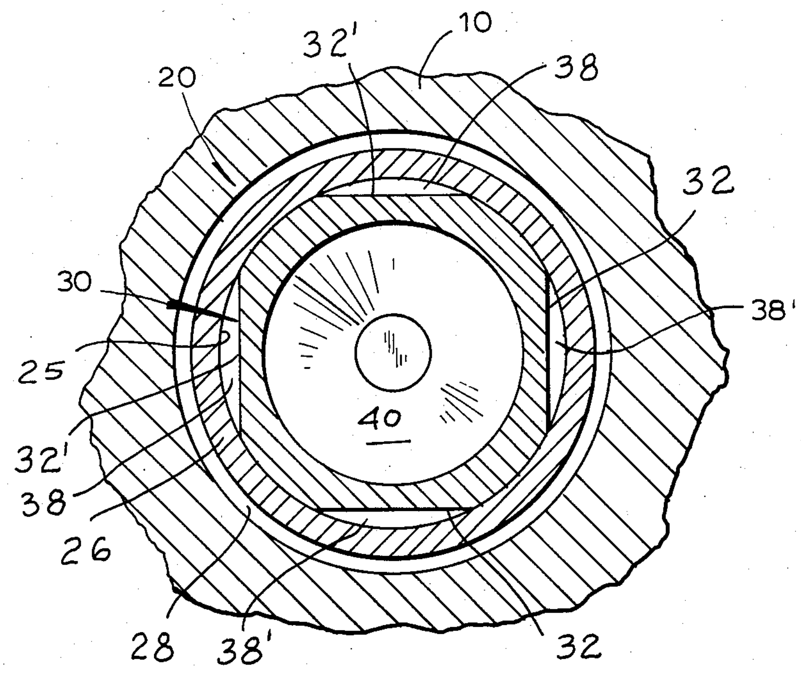
FIG. 3

FIG. 4
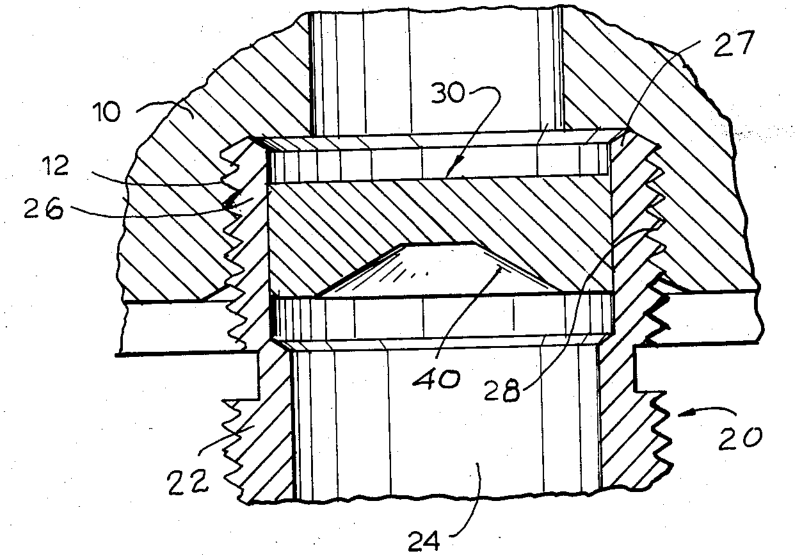
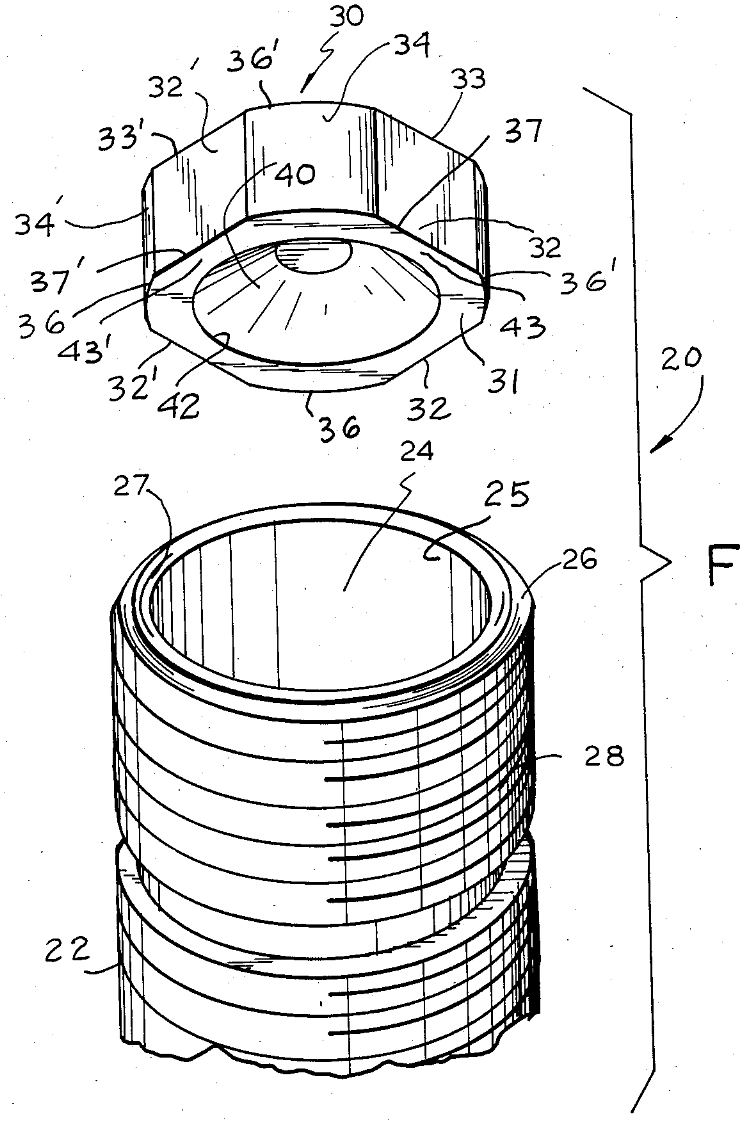
FIG. 5

CONTROL ASSEMBLY

BACKGROUND OF THE INVENTION

This invention relates to a control assembly for decreasing volume and noise of a fluid passing through a nozzle and, more particularly, to a flow control assembly coupled in the fluid communication to the outlet spout of a faucet.

There are various types of flow control assemblies presently employed wherein the assembly is assembled with a conduit to control the flow of a fluid and/or to reduce the noise of a fluid passing therethrough. Such control assemblies are described in the following U.S. patents:

U.S. Pat. No. 1,097,474 describes a device for mixing emulsions. An arrangement of coacting members and a corresponding annular recess are provided for introducing material at a plurality of points between the coacting members to form the emulsions.

U.S. Pat. No. 1,110,959 describes the use of a flexible hose which attaches to the outlet spout of a bathtub fitting in order to silently fill the bathtub.

U.S. Pat. No. 1,498,788 describes a relatively flat plate which is inserted into the outlet of a faucet spout. The plate is provided with a plurality of openings to restrict flow of water.

U.S. Pat. No. 2,194,163 describes a silencer made of a rubber which is attached to a faucet outlet. The silencer consists of an inner tubular member closed at one end and having numerous transverse perforations near its closed end. An outer tubular member is placed concentric over the inner member which is open only at its lower end so that water passes through the annular space formed between the inner and outer tubular members.

U.S. Pat. No. 2,320,050 describes a deflector plate mounted in a chamber of a faucet to reduce the flow of water to reduce fluid noise.

U.S. Pat. No. 2,401,665 describes an oil well choke to meter the amount of oil flowing from a well. The choke consists of a shell and a ceramic core body having an axial bore for metering the flow of oil. A non-ferrous bushing is fused about the core to threadly retain it in the shell.

U.S. Pat. No. 2,762,397 describes a flow control device which utilizes a resilient plate having a diameter less than the diameter of its housing in which it is mounted. The housing is formed having a plurality of radially disposed slots. When the device is in use, the resilient plate will expand so that the cross sectional area of the radially disposed slots varies with the hydraulic pressure.

U.S. Pat. No. 3,697,002 describes a flow control device which includes two tandem arranged disc structures to be inserted into the discharge end of a conduit. The upstream disc is flexible and has a plurality of apertures or openings formed therethrough. The downstream disc is formed of a rigid material and also has similar openings. The flexible disc nests on projections formed on the rigid disc and when fixed in the spout end, the pressure of the water passing through the openings of the rigid disc cause a change in the cross sectional area of the openings in the flexible disc, thereby regulating water flow.

U.S. Pat. No. 4,200,119 describes a device for regulating the flow of fluid into a conduit and is regulated by means of a spring biased ball by which an orifice increases or decreases in diameter when subjected to various hydraulic pressures.

U.S. Pat. No. 4,294,298 describes a flow control device which includes a disc, having a protruding boss in which radially opposed slots are formed which are designed to prevent clogging without affecting the designed flow rate.

SUMMARY OF THE INVENTION

It is an object of the present invention to provide a flow control assembly which requires no adjustment when placed in fluid communication in a tubular conduit or nozzle and, when assembled, forms a fixed or integral part of the nozzle assembly.

It is another object of the invention to provide a flow restrictor having a plurality of faces which, when mounted in a cylindrical housing, defines a plurality of longitudinally extending passageways disposed between the inner wall surface of the housing and the faces of the restrictor means which reduce the flow and noise of the fluid passing through the cylindrical housing, regardless of the hydraulic line pressure fluctuations encountered during fluid flow.

It is a further object of the invention to provide a rigid flow restrictor means which includes a means for removing entrained particles from the fluid before passing through the fluid passageways of the control assembly.

It is a further object of the invention to provide a control assembly which is relatively easy to manufacture, utilizes a minimum number of parts, and which is inexpensive, simple and easy to install in a tubular nozzle or faucet assembly.

The invention generally contemplates providing a control assembly for coupling to a tubular nozzle, such as a faucet spout of a sanitary fitting. The nozzle or spout includes a fluid passageway, a fluid inlet opening at one end thereof and a fluid outlet opening at the other end of thereof. A fluid control assembly is positioned at one end of the passageway and is in fluid communication therewith. The fluid control assembly includes a cylindrical housing, and a flow restrictor means is positioned transversely in the housing and is disposed in fluid communication with the nozzle passagway. The flow restrictor means, which has a plurality of faces, is mounted in the housing to define a plurality of longitudinally extending passageways positioned between the inner wall surface of the housing and the faces of the restrictor means to reduce the flow of a fluid passing through the nozzle. The flow restrictor also includes noise suppressing means and is formed at the fluid inlet opening of each longitudinal passageway to decrease the noise of a fluid passing through the control assembly. The restrictor means also may include a receptor which traps particles entrained in the fluid prior to the fluid passing through the longitudinal passageways.

BRIEF DESCRIPTION OF THE DRAWINGS

FIG. 2 is an enlarged fragmentary, sectional, elevational view of the control assembly shown in FIG. 1;

FIG. 3 is a sectional view taken along the lines 3—3 of FIG. 2;

FIG. 4 is a sectional view taken along the lines 4—4 of FIG. 2; and

FIG. 5 is an exploded isometric view of one form of a flow restrictor means for mounting in a tubular member or nozzle, as illustrated in FIG. 1.

DESCRIPTION OF THE PREFERRED EMBODIMENT

Figure 1:
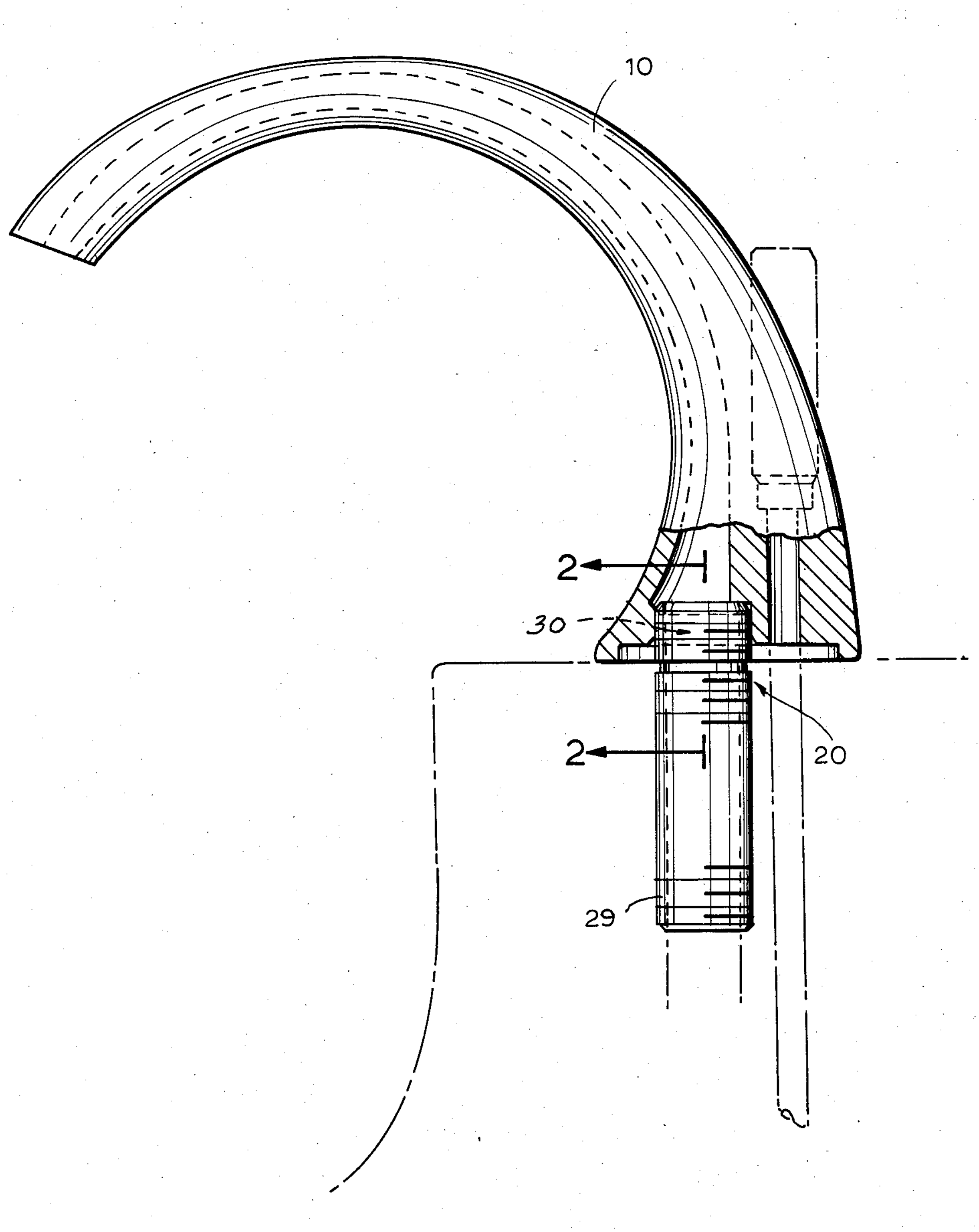
FIG. 1 is an elevational view, partly in section, illustrating the control assembly of the present invention mounted in a spout of a faucet.

Referring to FIGS. 1-4, control assembly 20 is shown mounted to a faucet spout 10. Spout 10 is of the type wherein the valve control elements, not shown, are separated therefrom. Spout 10 is coupled to the outlet conduits of the hot and cold water valve assemblies.

Control assembly 20, best shown in FIG. 5, includes a tubular conduit or shank 22 having a passageway 24 extending along its axial length. Passageway 24 is formed in housing 26 and is disposed at its outlet or upstream end 27. Shank 22 is cylindrical and has threads 28 formed around its outer surface to threadedly couple outlet end 27 to complimentary threaded inlet opening 12 of spout or nozzle 10, shown most clearly in FIGS. 2 and 4. The inlet or downstream end of shank 22 is likewise threaded for coupling to the outlet of the hot and cold water valve assemblies, not shown.

Flow restrictor 30, shown in full assembly in FIGS. 2,3 and in exploded view in FIG. 5, is made of a rigid material such metal, dimensionally stable plastics material or ceramics. Restrictor means 30 is preferably polygonal in cross section, having a plurality of vertically extending planar faces of equal dimensions and areas. In the preferred form, a parallelepiped shown in FIG. 5, flow restrictor 30 has four equal faces 32,32' which are vertically oriented, with each pair of opposing faces 32,32' being parallel to each other. The four corners are cylindrically shaped surfaces 36,36' and are likewise substantially equal in area. The distance between the opposed pairs of cylindrical surfaces 36,36' is slightly greater than the diameter of housing 26 so that the flow restrictor can be mounted therein by a press fit, as shown in FIG. 4. It can be seen that where the number of vertical faces are of an odd number, such as a triangle, pentagon or heptagon, the distance measured will be occur along a chord or diameter of housing 26 rather than the distance between the opposed faces of an even numbered sided polygon.

In FIG. 3, flow restrictor 30 is shown in bottom plan view and most clearly illustrates the cross sectional shape and area of each restrictor passageway 38, 38' through which fluid, i.e. water flows. Each passageway 38,38' is defined by inner wall 25 of housing 26 and corresponding vertical face 32,32' of flow restrictor 30. Each passageway 38,38' formed, is in the shape of longitudinal section of a cylinder which extends the axial length of flow restrictor 30.

The cross sectional area of water passageway 38,38' may be varied by increasing or decreasing the width 33,33' of face 32,32'. This can be achieved by varying the length of the arc 34,34' of faces 36,36' of flow restrictor 30. Flow restrictor 30 may take the form of a solid having two or more faces. Moreover, regardless of the number of water passageways formed, the flow rate should remain a constant at a maximum flow pressure. The flow restrictor, as shown in the drawings, is designed to maintain a maximum flow rate of 2.75 gallons per minute at 120 psi flow pressure. The flow rate may vary from about one gallon per minute at 20 psi and preferably to about 2.1 gallons per minute at about 60 psi. The noise level of water flow through control assembly 20 can be progressively decreased by varying the number of faces 32,32' on flow restrictor 30. However, as the number of faces 32,32' increases, the cross sectional area of each restrictor passageway is decreased. Therefore, the cross sectional area of each restrictor passageway is the limiting factor because tolerances become critical. While flow restrictor 30 may be formed having a minimum of two faces, a decrease in noise level can be achieved by increasing the number of faces 32,32', preferably up to about eight. It has been found, where the volume of water flow through a faucet is maintained at a constant, by increasing the number of faces 32,32' formed on flow restrictor means 30, a decrease in noise is achieved. The decrease in noise level is achieved by the increase of the number of flow passageways 38,38' formed between flow restrictor means 30 and the housing 26. By increasing the number of flow passageways, a proportional decrease in cross sectional area of each passageway is likewise achieved. A decrease of noise is achieved due to the phenomena that the velocity of a fluid is at its minimum at the outer zone sections, i.e. at the location of the restrictor passageways. Since it is known that the velocity of the flow of a fluid through a conduit is at its minimum at its outer zone of flow, a decrease in noise is achieved by the flow of the low velocity fluid through the flow restrictor passageways.

The upstream face 31 of flow restrictor 30 has a recess 40, preferably in the form of a truncated cone, whose lower base forms a rim 42 around lower face 31 of flow restrictor 30. Particle directing means 43,43', which is the area defined by the downstream edge 37,37' of vertical faces 32,32' and rim 42 of recess 40, diverts particles P entrained in water toward recess 40 which serves as a receptacle to collect and trap particles P therein such as is illustrated in FIG. 2, greatly exaggerated. It has been found that as area 43,43' is decreased, a more efficient removal of particles is achieved since the zone of high pressure of the water passing through housing 26 will be at its greatest within the zonal area of the base of the truncated cone. In this manner, particles P entrained in the water are easily removed before particles P entering restrictor passageway 38,38' can cause their clogging.

It is claimed:

1. A nozzle having a fluid passageway and fluid inlet and outlet openings at opposed ends thereof, said nozzle comprising:

a fluid control assembly positioned adjacent said fluid inlet opening of said nozzle passageway and being in fluid communication therewith;

said fluid control assembly including a cylindrical housing having an inner wall surface and a flow restrictor means;

said flow restrictor means shaped in the form of a polygon and having a plurality of vertical faces extending around the periphery thereof;

said polygon being mounted in said housing so that the vertices thereof contact the inner wall surface of said housing to provide a plurality of vertically extending passageways between each vertically extending face of said polygon and the inner wall surface of said housing;

said polygon having transversely extending, opposed end faces so that fluid is conducted only through said vertically extending passageways;

noise suppressing means is formed by the intersection of each of said vertical faces of said polygon with one of said transversely extending end faces at the fluid inlet opening of said fluid passageways, whereby the flow of fluid passing through said plurality of fluid passageways is decreased and noise of fluid passing through said nozzle passageway is reduced; and said opposed end face positioned at the fluid inlet opening of said nozzle passageway, includes an axially formed recess to provide particle diverting means whereby clogging of said fluid passageways is substantially reduced.

2. The nozzle according to claim 1 wherein said recess is frustro-conically shaped.

3. The nozzle according to claim 1 wherein each of said vertices of said polygon is a curved surface which is complimentary with said inner wall surface of said housing.

4. The nozzle according to claim 1 wherein said plurality of vertical faces of said polygon are four.

5. The nozzle according to claim 4 wherein said vertices of said polygon are four curved surfaces, the diameter between each opposed pair of said curved surfaces is of a length greater than the diameter of said housing to provide a force fit between said flow restrictor means and said housing.

6. The nozzle according to claim 1 wherein said nozzle is a faucet spout.

7. The nozzle according to claim 6 wherein said faucet spout has an axially extending passageway having fluid inlet and outlet openings at opposite ends thereof, a cylindrical housing having an inner wall surface is formed adjacent said fluid inlet opening and, a flow restrictor means is mounted transversely of said housing, said flow restrictor means having a plurality of vertical faces to define a plurality of vertically extending passageways between the inner surfaces of said housing and said faces of said restrictor means.

8. The faucet spout according to claim 1 where said vertices of said polygon are four curved surfaces formed between said adjacent faces, to form two pairs of opposed curved surfaces, the distance between each opposed pair being greater than the diameter of said housing to provide a force fit when said flow restrictor is mounted in said housing.

9. A faucet spout having a water passageway and water inlet and outlet openings at opposed ends thereof, said faucet spout comprising:

a water control assembly positioned adjacent said water inlet opening of said faucet passageway and being in fluid communication therewith;

said flow restrictor means shaped in the form of a polygon and having a plurality of vertical faces extending around the periphery thereof;

said polygon being mounted in said housing so that the vertices thereof contact the inner wall surface of said housing to provide a plurality of vertically extending passageways between each vertically extending face of said polygon and the inner wall surface of said housing;

said polygon having transversely extending, opposed end faces so that water is conducted only through said vertically extending passageways;

wherein noise suppressing means is formed by the intersection of each of said vertical faces of said polygon with one of said transversely extending end faces at the water inlet opening of said water passageways, whereby the flow of water passing through said plurality of water passageways is decreased and noise of water passing through said faucet spout is reduced; and said opposed end face positioned at the water inlet opening of said faucet spout passageway, includes an axially formed recess to provide particle diverting means whereby clogging of said water passageways is substantially reduced.

10. The faucet spout according to claim 9 wherein said water control assembly includes a cylindrical housing having an inner wall surface extending along the axial length thereof, and a flow restrictor means positioned transversely in said housing and thread means formed around the water outlet opening of said housing for threadedly coupling said housing in said faucet passageway.

11. The faucet spout according to claim 9 wherein the number of vertical faces formed on said polygon is four.

* * * * *